350-275
CROSS REFERENCE   SEARCH ROOM
Oct. 12, 1965  E. C. STREETER, JR  3,210,809
ELECTRIC FIELD OPERATED LIGHT AND RADIANT HEAT SCREEN
Filed Jan. 9, 1961  2 Sheets-Sheet 1
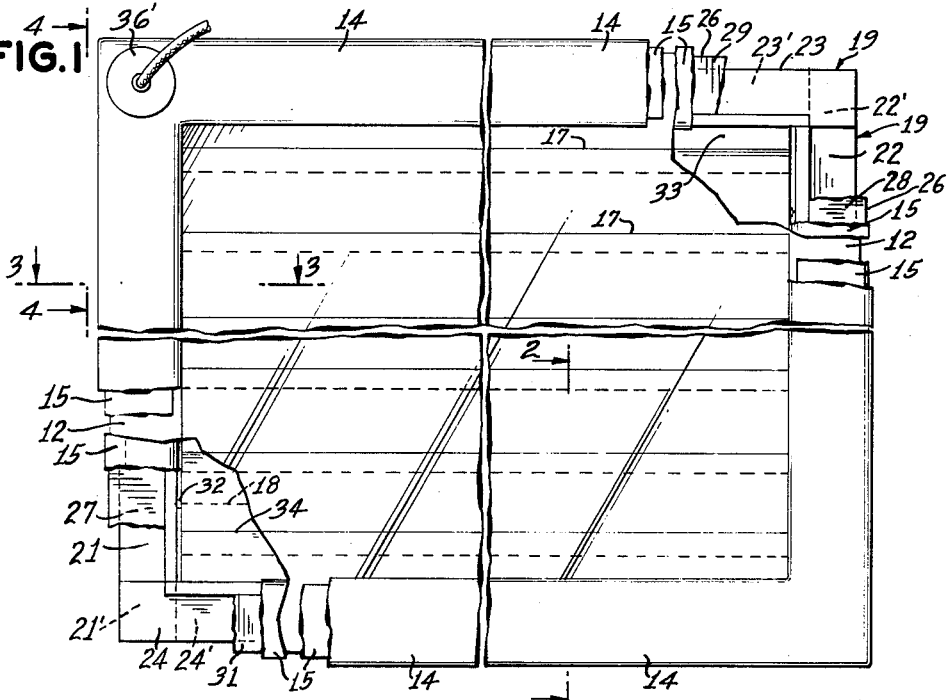
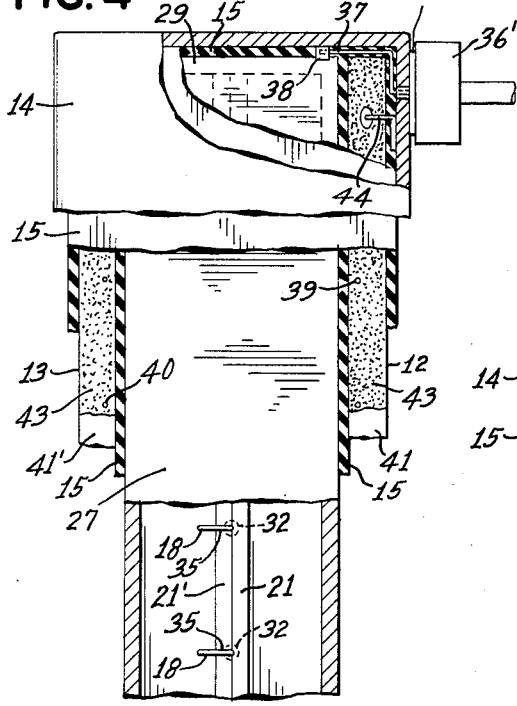
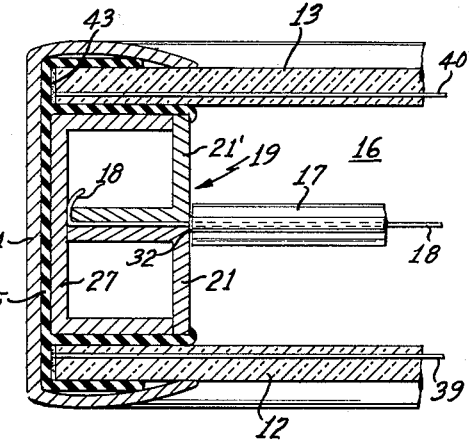
INVENTOR.
Edward C. Streeter, Jr.
BY
James A. Eisenman
& John C. McGregor
ATTORNEYS Oct. 12, 1965  E. C. STREETER, JR  3,210,809
ELECTRIC FIELD OPERATED LIGHT AND RADIANT HEAT SCREEN
Filed Jan. 9, 1961   2 Sheets-Sheet 2
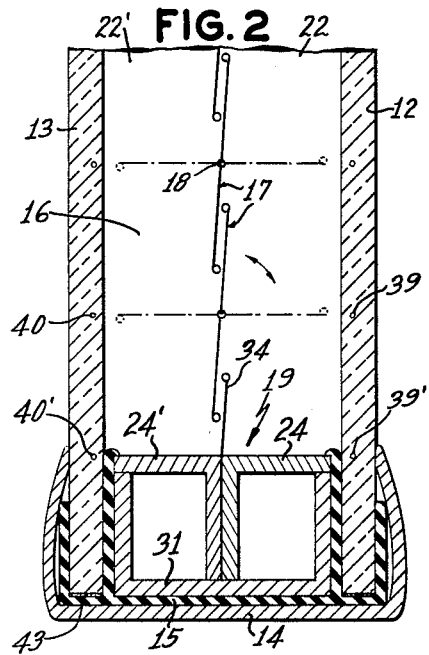
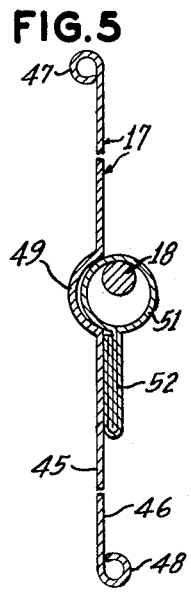
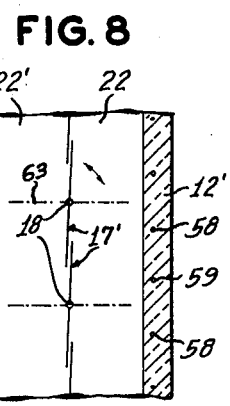
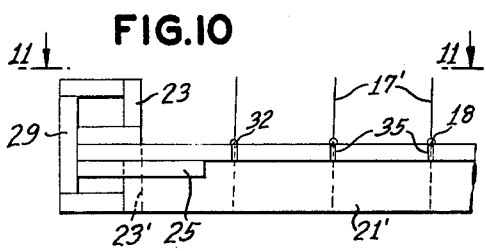
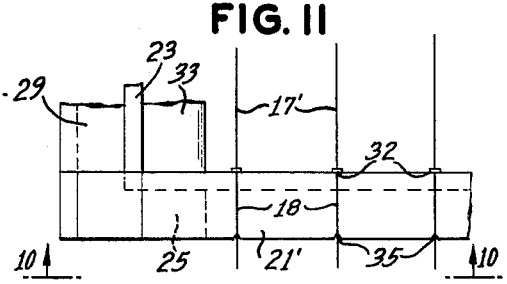
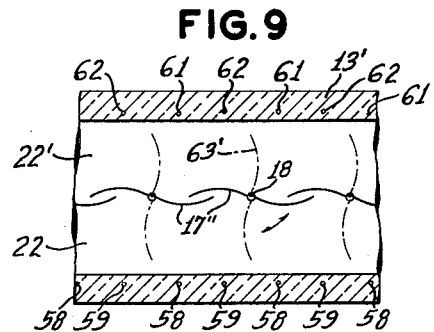
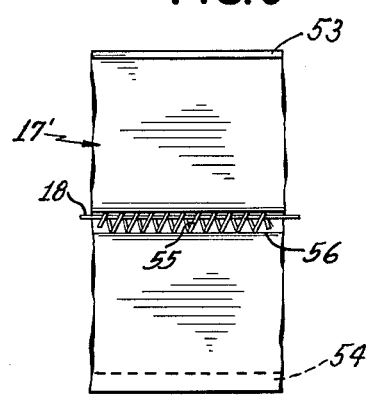
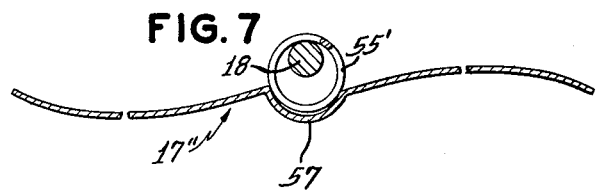
INVENTOR.
Edward C. Streeter, Jr.
BY James A. Eisenman
John C. McGregor
ATTORNEYS

United States Patent Office 3,210,809
Patented Oct. 12, 1965

3,210,809
ELECTRIC FIELD OPERATED LIGHT AND RADIANT HEAT SCREEN
Edward C. Streeter, Jr., 12 W. 83rd St., New York, N.Y.
Filed Jan. 9, 1961, Ser. No. 81,553
3 Claims. (Cl. 20—56.5)

This invention relates to the control of the transmission of electromagnetic energy between a source of radiation and an absorbing medium. More specifically, the invention provides an electric field operated screen for varying the proportion of light and/or radiant heat incident on a given area that is reflected or absorbed.

Considerable control over light, heat transfer and solar radiation through a given area has been obtained by the provision of a light modifying screen in the air space between two plates of glass. Venetian blinds thus positioned reduce the heat transmission 30 percent when closed. A window construction having adjustable vanes in a hermetically sealed air space is disclosed in U.S. Patent No. 2,281,071 granted April 28, 1942.

The present invention not only reduces the weight, operational complexity and cost of maintenance of such light modifying screens, but also increases their thermal and optical efficiency and convenience of control.

Every serious student of electricity knows that two isolated electrically conductive objects at different potentials exert an attraction on each other dependent upon the square of their potential difference, their shapes, their separation, and the nature of the intervening dielectric medium. The electric field always acts in tension along the lines of force, without regard to which object is at the higher potential. This phenomenon is initially taught when considering the fundamental laws of electrostatics, but it is equally true of variable unidirectional or alternating electric fields.

The present invention provides elongated metallic vanes turnable about parallel transversely spaced longitudinal axes extending along the approximate center lines of the vanes, means for applying a restoring torque to each vane tending to maintain them in a partially overlapping closed position in which each vane is partially electrically shielded by the next vane, a pair of transparent plates parallel to the plane containing the axes of the vanes and respectively disposed substantially equidistant from the plane on either side thereof and hermetically sealing the vanes from the ambient atmosphere, an electric field inducing electrode supported by one of the plates; and electric connections for applying a high potential between the vanes and the electrode, whereby a torque unbalance is exerted on the closed vanes in response to an applied potential, and the vanes are held at a common angle dependent upon the effective amplitude of said potential.

The enclosed location of the vanes prevents dust and films of soot and/or moisture from impairing their reflectivity, protects them from air currents and physical damage, and improves their electrical efficiency by providing an environment of low relative humidity.

The screen is an efficient thermal-insulating barrier when the vanes are highly reflective, at least on one side.

The vanes are conveniently made of thin sheet metal, such as aluminum or stainless steel.

Each vane is pivotally supported about its transverse center in a substantially balanced condition to minimize the necessary turning torque. It is, however, often convenient to provide sufficient unbalance to insure that each vane assumes a predetermined attitude under the influence of gravity in the absence of any electric field. The turning axes run parallel to each other, either horizontally, or from top to bottom, in a vertical or inclined plane. The axes may be aligned as a group in any azimuth direction when in a horizontal plane.

The separation of the turning axes is made less than the transverse dimension of the vanes, with the result that the latter partially overlap each other in their closed position. The overlapping portion of one vane electrically shields the underlying portion of an adjacent vane. The vane, itself, is partially shielded by the adjacent vane on the other side. This overlapping creates an initial electrical unbalance, resulting in a torque on each vane in the presence of the electric field.

The electric field is created by establishing an effective potential difference of from several hundred to several thousand volts between the vanes and one or more control electrodes in the path of the radiant energy. Although the control electrode or electrodes should not unduly obstruct the flow of radiant heat or light, they vary greatly in appearance, according to the use of the screen.

The wire of conventional wire glass is suitable for use in skylights. Wire glass of a new parallel wire design, discussed hereinafter, is satisfactory in windows. A semi-transparent, vaporized metallic coating is useful in oven doors. Laminated safety glass, with wires in the plastic inner layer, is preferable for the sun roofs of buses and automobiles. Glass, having a transparent electrically conductive metal oxide layer, such as a stannic oxide film, is particularly suitable.

The outstanding advantage of the present invention is that the amount of light and radiant heat transmitted through glass areas may be substantially altered at the touch of a switch, or under automatic control, with the consumption of insignificant electrical power. In effect, windows and skylights are instantly convertible into walls and roofs having low heat transmission coefficients, low absorptivities to solar radiation, and short thermal time lags.

It is believed that, in climates having appreciable temperature changes, the present screen will prove to be the most economical type of fenestration, more than paying for itself over its lifetime by reducing the initial cost and operating expense of air conditioning equipment, and/or by saving heating fuel. Against the cost of the screen must be credited the cost and maintenance of venetian blinds or other shades, which are thereby eliminated.

Sylights in severe climates will now be practical, because solar heating can be enjoyed in cold weather without the overbalancing heat loss on cloudy days and at night. The admission of solar energy and summer heat can be reduced to less than that of a conventionally insulated roof.

In order that the invention may be more fully understood, it will now be described in detail, with reference to particular embodiments illustrated in the accompanying drawings, wherein:

FIGURE 1 is a front elevational view looking outdoors at a window employing the new screen, with portions broken away to reveal the internal construction;

FIGURE 2 is a side elevational cross-section taken along dashed lines 2—2 of FIGURE 1, in the direction of the arrows;

FIGURE 3 is a plan cross-section taken along dashed lines 3—3 of FIGURE 1, in the direction of the arrows;

FIGURE 4 is a left side elevation of the screen shown in FIGURE 1;

FIGURE 5 is a greatly-enlarged, transverse cross-section of a vane;

FIGURE 6 is an exterior elevation of a central portion of a modified vane, suitable for a window;

FIGURE 7 is a transverse cross-section of another form of vane, suitable for a skylight;

FIGURE 8 is a side elevational cross-section on an enlarged scale of a central portion of a window employing the vane shown in FIGURE 6;

FIGURE 9 is a transverse elevational cross-section on an enlarged scale of a central portion of a skylight employing the vane shown in FIGURE 7;

FIGURE 10 is a left side elevation of a partially completed vane frame in a horizontal position, before wires supporting the vanes are clamped in place; and FIGURE 11 is a plan view of the partially completed vane frame shown in FIGURE 10.

Referring now to FIGURES 1 through 4, an electric field-operated screen used as a window is shown comprising a vane assembly, resiliently clamped between an interior glass plate 12 and an exterior glass plate 13 by a metal frame 14 which surrounds and protects the periphery of the glass plates. A sealing member 15 covers the edges of the glass and the outer periphery of the vane assembly and extends between the inner surfaces of the glass and the opposing faces of the vane assembly. The sealing member 15 hermetically seals an air chamber 16 within the vane assembly from the atmosphere and electrically insulates the vane assembly from the metal frame 14.

The vane assembly consists of a plurality of parallel, elongated, partially overlapping, electrically conductive, opaque vanes 17, which are mounted on equally spaced horizontal support wires 18 to permit tilting about their longitudinal center lines. The support wires are secured under slight tension to a rectangular metal frame 19 by being clamped between left side angle members 21, 21' and right side angle members 22, 22' which are fastened together in face-to-face relation with their non-abutting faces forming a common plane perpendicular to the glass plates and facing the air chamber 16. The frame 19 is completed by top angle members 23, 23' and bottom angle members 24, 24' fastened in a manner similar to the side angle members. At the four corners of the frame, members 21' and 22' overlap members 23 and 24, while members 21 and 22 abut members 23 and 24 and members 23' and 24' abut members 21' and 22'. Right angle braces 25 (see FIGURES 10 and 11) are provided at the corners for rigidity.

A housing 26, consisting of left and right side channel members 27 and 28, respectively, and top and bottom channel members 29 and 31, respectively, surrounds the angle members of the frame and is secured thereto with the flange formed by the abutting faces of the angle members received within the channel. A dehydrant, such as silica gel, is placed in the remaining space between the angle members 21–24, 21'–24' and the housing 26 during assembly and communicates with the air chamber 16 through the narrow slits created by the support wires 18.

The vane assembly is completed by the provision of split washer thrust bearings 32 between the ends of the vanes 17 and the sides of the frame 19 and a top half-vane 33 and a bottom half-vane 34 fixed between the top angle members 23, 23' and the bottom angle members 24, 24', respectively. The half-vanes 33 and 34 are necessary to permit satisfactory operation of the first and last movable vanes.

As a further precaution against slippage, the wires 18 are bent at right angles into grooves 35 in the edge of side angle members 21' and 22' and extend slightly into the space enclosed by the housing channel members 27 and 28, respectively.

A receptacle 36 mounted on the indoor face of the covering frame 14 is adapted to receive a plug 36' attached to an electrical cable for the purpose of supplying high potential to the vanes 17. The receptacle 36 is connected by a flexible conductor 37 to an electrical terminal 38 sealed in the sealing member 15 and attached to the housing 26. The path from the receptacle 36 to the vanes 17 includes, as best seen in FIGS. 3 and 4, the conductor 37, the terminal 38, the housing 26, including the channel member 27 against which the metallic vane support wires 18 are tightly clamped by the angle members 21 and 21' of the frame 19. The angle members 21 and 21' also are in contact with both the channel member 27 and the support wires 18 on which the metallic vanes rest. In this fashion there is metal-to-metal contact from the vanes 17 to the voltage receptacle 36 by means of which the control potential is applied to the system.

Control electrodes 39 and 40 are provided within the glass plates 12 and 13, respectively, in the form of a plurality of horizontal equally spaced wires. The control electrodes 39 and 40 have the same spacing as the vane support wires 18 and, in order to be entirely inconspicuous when the vanes are completely open, each control electrode is located in the horizontal plane containing the associated vane support wire 18. Guard electrodes 39' and 40' are provided at or near the top and bottom of the air chamber 16 to preserve the shape and strength of the electric field acting on the first and last movable vanes. The field would be diminished and distorted by the presence of members 23, 23' and 24, 24' of the frame 19 in the absence of the guard electrodes 39' and 40'. The vertical edges 41, 42 and 41', 42' of the glass plates 12 and 13, respectively, where ends of the electrodes 39 and 40 appear, are covered with a conductive coating 3, such as carbon particles in a volatile carrier liquid, which electrically connects together all the wires in one glass plate. Even where the wire has broken off beneath the surface of the glass, the coating is drawn into the hole by capillary action. Since both ends of each wire are connected to the coating 43, the possibility of a failure of a contact is reduced. A flexible conductor 44 is attached to the coating 43 and grounded to the metal frame 14.

The vane 17, shown in enlarged cross-section in FIGURE 5, is made of thin sheet metal and usually has light-diffusing exterior and interior faces 45 and 46, respectively, of high reflectivity. Aluminum foil 0.001 inch thick was used in a particular screen. The upper edge of each vane terminates in an outwardly extending cylindrical rim 47 and the lower edge terminates in an inwardly extending cylindrical rim 48. A semi-cylindrical groove 49 is formed at the center line of the vane on the interior face 46. Attached to the groove 49 is a cylindrical bearing 51, which is also made of sheet material with its seam extending radially to provide a flange 52 which is folded in half. The cylindrical bearings 51 is cemented to the groove 49 with the flange folded under and pointed downwardly.

The rims 47 and 48 not only give rigidity to the vane 17, but also provide a light trap between adjacent vanes in their closed position. The rims furthermore reduce the electric intensity at the edges by increasing the radius of curvature and this improves the electrical efficiency of the screen. The flange 52 on the bearing 51 provides most of the desired unbalance which causes the vane 17 to assume a substantially vertical position in the absence of any electrical field. Each vane is overlapped by the adjacent vane above and each, in turn, overlaps the adjacent vane below. In operation, the lower edge swings outwardly and the upper edge swings inwardly. Obviously, the vanes can easily be arranged to swing in the opposite direction.

The cylindrical bearing is given an inner diameter substantially larger than the diameter of the support wire 18, with a result that the necessary starting torque is reduced by a rolling contact rather than by a sliding contact. Bronze foil may be employed for the bearing material without impairing the insulation value of the screen, because the bearing is attached to the inner face 46 of the vane. The vane 17 pivots on the support wire 18 from a point above its center, because of the loose bearing fit and this relationship contributes to the pendulousness of the vane.

The support wires 18 have a small diameter in order to avoid appreciable sag when maintained under a modest tension which does not unduly load the vane frame 19. The support wires are initially subjected to a straightening process to eliminate any tendency to curl. It is also essential for uniform operation that the wires be free of kinks, because each portion of the vane should turn about a common axis. In one embodiment of the invention, tinned steel music wire, having a diameter of 0.015 inch, was found satisfactory.

In operation, either alternating or direct potential is applied between the vanes and the control electrodes. As the potential is increased, there is no movement of the vanes until the torque due to the electric field overcomes the starting friction. The vanes then tilt away from their closed position until the electric torque is balanced by the torque created by gravity, which latter torque varies as the sine of the angle of the vanes measured from their closed position. As the vanes separate, the electrical shielding disappears. However, the longitudinal halves of the vanes are subject to an increasingly unequal torque, arising from the inequality of their distances to the control electrodes on the same side of the vanes. When the potential is further increased, the electric torque is appreciably augmented by the reduction in the average distance of the vanes from the control electrodes. Meanwhile, the torque due to gravity is increasing more slowly with the change in vane angle. Finally, unstable equilibrium may be encountered at an angle that differs in accordance with various design factors, but which may be adjusted to be more than 45 degrees from the closed position. If this occurs, the vanes swing abruptly to an attitude substantially perpendicular to the glass plates. The angle of the vanes may be lowered below the perpendicular by reducing the potential. Near the perpendicular, almost half of the lines of force terminate on the underside of the vanes. The lowered vane angle brings about a more favorable configuration of the electric field, which, together with the slightly reduced gravity component, tends to balance the decrease in field strength resulting from the reduced potential and increased distance.

The force created by a sinusoidal alternating potential varies sinusoidally at twice the potential frequency, falling to zero twice each cycle of the potential. There is, therefore, some tendency to hum at twice the potential frequency. The effective force varies as the square of the root mean square amplitude. The load is an almost pure capacitive reactance.

One of the unusual features of the new screen is that it is a potential-operated electric device, in contrast to the usual current-operated electromagnetic devices. Theoretically no power need be consumed except when the vanes are in motion, and the electric field is altering its configuration. The stationary vanes present a very high resistive load to a direct potential. The resistance of a screen used as a window of average size is measured in thousands of megohms. This load is primarily a result of insulation leakage. Since the direct load current is so small, the direct potential obtained from rectifying an alternating potential is substantially equal to the alternating peak amplitude. Filtering and regulation are immaterial. Accordingly, the force developed by a direct potential is twice that produced by the alternating potential before rectification. It is, therefore, advantageous to operate the screen with direct potential.

A further unusual feature of the new screen is that an incremental actuating torque is provided for each longitudinal increment of the vane. Thus, the length of the vane is only limited by the appearance of sag in the support wire. There is no tendency of one portion of the vane to twist relative to another portion of the same vane.

An approximate analysis of the electric field acting on the vanes in their closed position is helpful in understanding the factors which affect the initial actuating torque per unit length of vane. The closed vanes form a common conductive sheet, substantially parallel to the plane of the control electrodes. When the control electrodes comprise a parallel conductive sheet, for example, a transparent stannic oxide film on the inside surface of the glass plate, it is obvious that the arrangement is essentially a parallel plate capacitor. The tensional stress "S," or force per unit area, can be approximately expressed as $$S = \frac{k^2 V^2}{8\pi d^2} \quad (1)$$

or $$S = 2\pi V^2 C^2 \quad (2)$$

in which:

$k$=dielectric constant,
$V$=potential difference,
$d$=distance between the plane of the closed vanes and the plane of the electrodes, and
$C$=capacitance per unit area.

Note that the potential must be doubled if the distance is doubled, in order to maintain the same stress.

Now, if the control electrodes are wires, as shown in FIGURE 1, having a spacing roughly equal to the distance to the vanes, the electric field becomes analogous to the map of the potential associated with an infinite series of equidistant, equally charged, source lines. At this relative distance from the plane of the source lines, the lines of force are substantially uniformly distributed and are directed substantially perpendicularly to the plane of the source lines. Equation 2 can then be employed to express the tensional stress on the vanes, and, since the capacitance per unit area is determinable, can guide the design of the screen.

The capacitance "C" per unit area of an infinite plane array of equidistant, equipotential, cylindrical electrodes is $$C = \frac{2\pi k}{2\pi d + s \log \frac{s}{2\pi r}} \quad (3)$$

in which the distance "d" is equal to or greater than the spacing "s" between the centers of adjacent cylindrical electrodes of radius "r."

A study of the above equation will reveal that the capacitance and, accordingly, the electric stress, increases relatively slowly, as the radius of the electrodes is increased, or as the spacing between the electrodes is decreased. However, duplicating the control electrodes on the other side of the vanes doubles the electric stress. Therefore, it is possible to employ the least conspicuous and smallest physically practical wires by merely operating at a slightly higher potential and associating half the wires with each glass plate. Control electrodes 0.005 inch in diameter have been found satisfactory.

It is to be observed that, athough Equation 3 assumes that the plane containing the control electrodes is parallel to the plane containing the vane support wires, the control electrodes may lie at any desired angle within the plane of their array, for example, perpendicular to the support wires.

Clearly, when half the area of each vane is overlapped, i.e. when the overlay extends to the turning axis, the available stress will be converted into the maximum torque. This condition is usually impractical and a quarter overlap, corresponding to the practice with Venetian blinds, seems a good compromise.

Glass having a high dielectric constant and control electrodes close to the inner surface of the glass yield the strongest field acting on the vanes.

The control electrodes are usually maintained at ground potential, because a negative electrode is created by rain on the outer glass plate of a window or skylight. Even the invisible moisture film always present on the surface of glass attains sufficient thickness to act as a conductive sheet at ground potential when the humidity is above about 85 percent, because the load resistance of the new screen is so very great. If the control electrodes were at a high positive or negative potential and the vanes at ground potential, the electric field would be established almost entirely with the closely adjacent, parallel, grounded, spurious electrode and the stress on the vanes would be seriously reduced. These conditions, however, merely tend to strengthen the actuating electric field when the control electrodes are themselves grounded.

An exterior elevation of a modified vane 17', suitable for a window or other vertical screen, is shown in FIGURE 6. The vane 17' is made of a thin metal sheet, with double thickness portions 53 and 54 at the top and bottom edges, respectively, formed by folding the sheet back upon itself. The folded bottom portion 54 is wider than the portion 53 to render the vane pendulous when suspended from its center. A helical bearing 55, comprising an open helix of wire extending the length of the vane 17', is cemented in a semi-cylindrical centering groove 56. The outer diameter of the bearing 55 is substantially equal to the diameter of the centering groove 56. Alternatively, the bearing 55 may comprise a plurality of longitudinally spaced helices, each having several turns.

A cross-section of another form of vane 17" is shown in FIGURE 7, suitable for a skylight or other relatively horizontal screen. The vane 17" is of an S-shaped cross-section which provides rigidity and interlocking with adjacent vanes. The vane is attached to a helical wire bearing 55' similar to that shown in FIGURE 6. Only a portion of the lower half of the bearing 55' is received in an arcuate centering groove 57, which extends along the vane 17". The transverse halves of the vane 17" balance each other, but the vane hangs in its closed position with corresponding points on either half tangent to the glass plates 12 and 13, because the turning axis lies above the axis of symmetry of the vane. The amount of pendulousness is proportional to the inner diameter of the bearing 55', plus the diameter of the wire from which the bearing is made and less the depth to which the bearing enters the groove 57. The angle at which the vane 17" balances in the absence of an electric field is shown as horizontal, but the vane may be bent, cut or weighted to balance at whatever angle to the horizontal it is desired to mount the skylight.

FIGURE 8 shows the vanes 17' on an enlarged scale, employed in a window having glass plates 12' and 13', each provided with two control electrodes for each vane. Vane support wires 18 lie on the perpendicular bisector between lower electrodes 58 and 61 in plates 12' and 13', respectively, and upper electrodes 59 and 62 in plates 12' and 13', respectively. All the electrodes are equally spaced. According to Equation 3, the available force is increased by 44 percent, by reducing the electrode spacing to one half the previous spacing.

FIGURE 9 shows the vanes 17" on an enlarged scale, employed in a skylight having glass plates 12' and 13' as in FIGURE 8.

A brief discussion of the method of assembly is thought appropriate to demonstrate that the screen is well suited to mass production. FIGURES 10 and 11 show the top portion of the left side of a partially completed frame 19 in a horizontal position immediately prior to clamping the support wires 18 carrying the vanes 17' and the thrust bearings 32. The angle member 21, the housing channel member 27, and the corresponding members on the right side of the frame 19 have not yet been attached.

The vanes 17' are formed in a continuous process from aluminum foil and are cemented to the helical bearing 55 surrounding the parallel support wires 18, which move at a somewhat greater speed. Each helical bearing 55 is conveniently placed around its associated support wire 18 by continuously winding the bearing wire on a tubular mandrel (not shown) through which the support wire passes. The helix of the bearing 55 is moved in the direction of the movement of the support wire 18 to draw loops off the mandrel at the same speed as they are formed. The vanes 17' and bearing 55 are periodically cut to the correct length while on the support wires and the split thrust bearings 32 are then slipped onto the wires. The greater speed of the support wires separates the detached vane from the subsequent uncut vane on the same support wire.

The partially completed frames 19 are carried at the speed of the support wires on a conveyor (not shown) which raises a frame to surround the lower halves of the vanes, when the vanes are longitudinally centered above the frame. The angle member 21 and the corresponding member 22 on the right side of the frame 19 are pressed into place and attached, usually by welding. The support wires 18, extending from the sides of the frame 19, are then bent over and cut off, after the support wires have been clamped to the next frame.

Finally, the housing channel members 27 and 28 are fastened to the frame, which is then ready to be covered by the sealing member 15 and placed between the glass plates 12 and 13. The channel members 27 and 28 are preferably slightly bowed outwardly to compensate for the slight inward reflection of the angle members 21, 21' and 22, 22' under the load of the support wires 18.

Although an assembly with an organic air seal effected at ambient temperature has been illustrated and described, the screen is well adapted for use with a metal to glass air seal, because all parts can withstand soldering temperatures.

The effectiveness of the present screen, in substantially eliminating the admission of solar energy, should be apparent. The benefits of this arrangement have been confirmed in Ashrae Research Report 1721 entitled "Solar Heat Gains Through Slat-Type Between-Glass Shading Devices" by N. Ozisik and L. F. Shutrum, published in Ashrae Transactions, volume 66 (1960), pages 359–373. The reduction of the heat transmission coefficient caused by closing the vanes is more surprising. The heat transmission coefficient is from one-third to one-fifth the coefficient of a single plate of glass depending primarily upon the emissivity of the vanes.

The central location of the vanes produces two air spaces of equal thickness when the vanes are closed. Equal division of the available air space provides the maximum overall resistance to heat flow.

I claim:

1. An adjustable vane-type window assembly comprising a plurality of elongated metallic vanes turnable about parallel, transversely spaced longitudinal axes extending along the approximate center lines of said vanes, means for applying a restoring torque to each vane tending to maintain said vanes in a partially overlapping closed position wherein each vane is partially electrically shielded by an adjacent vane, a pair of transparent plates parallel to the plane of said axes disposed substantially equidistant from the plane of the axes of the vanes on either side thereof and hermetically sealing said vanes from the ambient atmosphere, an electric field-inducing electrode supported by one of said plates, and electric connections for applying a high potential between said vanes and said electrode, whereby a torque unbalance is exerted on the closed vanes in response to an applied potential, and said vanes are held at a common angle dependent upon the effective amplitude of said potential.

2. A window assembly according to claim 1 wherein the electric field-inducing electrode is connected to ground.

3. A window assembly according to claim 1 wherein the electric field-inducing electrode is a plurality of wires embedded in said one plate.

References Cited by the Examiner

UNITED STATES PATENTS 1,521,192  12/24  Jenkins _____ 88—61
1,606,526  11/26  Graham _____ 20—40.5

(Other references on following page)

UNITED STATES PATENTS

| | | | |
|---|---|---|---|
| 1,848,888 | 3/32 | Kendall. | |
| 2,238,137 | 4/41 | Strubig et al. | 178—7.5 |
| 2,281,071 | 4/42 | Knudsen | 20—56.5 |
| 2,528,510 | 11/50 | Goldmark. | |
| 2,792,752 | 5/57 | Moncrieff-Yeates et al. | 88—61 |
| 2,804,803 | 9/57 | Edwards et al. | 88—106 |
| 3,022,549 | 2/62 | Cummings | 20—56.5 |

HARRISON R. MOSELEY, *Primary Examiner.*

GEORGE A. NINAS, Jr., NORTON ANSHER,
*Examiners.*